March 16, 1971   J. G. MORROW   3,570,327
MULTISPEED DRIVE ARRANGEMENT

Filed Dec. 2, 1968   2 Sheets-Sheet 1

INVENTOR
JAMES G. MORROW

INVENTOR
JAMES G. MORROW

United States Patent Office 3,570,327
Patented Mar. 16, 1971

3,570,327
MULTISPEED DRIVE ARRANGEMENT
James G. Morrow, Manitowoc, Wis., assignor to The Manitowoc Company, Inc., Manitowoc, Wis.
Filed Dec. 2, 1968, Ser. No. 780,480
Int. Cl. F16h 47/00
U.S. Cl. 74—718      9 Claims

ABSTRACT OF THE DISCLOSURE

A multispeed drive arrangement for winches and the like comprises first and second adjacent torque converters arranged to drive the winch in low and high ranges respectively. The high speed torque converter drives an output shaft connected to the winch. The low speed torque converter drives a wheel mounted on the output shaft and selectively connected therewith by a clutch.

BACKGROUND OF THE INVENTION

Torque converters are well known in the art for providing a variable drive between prime mover and device requiring a power input. It has been found that the use of torque converters to operate winches is unsatisfactory because a torque converter having satisfactory high speed characteristics does not have satisfactory low speed, high torque characteristics. Conversely, a torque converter having satisfactory low speed, high torque characteristics does not have satisfactory high speed characteristics.

It is accordingly an object of the invention to provide a multispeed drive arrangement utilizing a plurality of adjacent torque converters which has satisfactory high and low speed performance characteristics.

Another object of the invention is to provide a winch and drive arrangement therefor, utilizing a plurality of torque converters wherein one of the torque converters drives the winch during low speed operation and the other torque converter drives the winch during high speed operation.

A still further object of the invention is to provide a drive arrangement of the aforementioned type wherein a small wheel is fixed to the output structure of the low speed torque converter, a large wheel is rotatably mounted on the output structure of the high speed torque converter, means interconnecting the first and second wheels, and clutch means selectively interconnecting the output structure of the second torque converter to the large wheel.

SUMMARY OF THE INVENTION

A multispeed drive arrangement particularly adapted for use with winches is provided comprising first and second torque converters, means interconnecting the torque converter input structures together for rotation in the same direction, and means selectively interconnecting the torque converter output structures together for rotation in the same direction including a reduction unit between the output structures having a clutch means selectively operable to interconnect the output of the reduction unit and the output of the high speed torque converter.

DETAIL DESCRIPTION OF THE INVENTION

Figure 1:
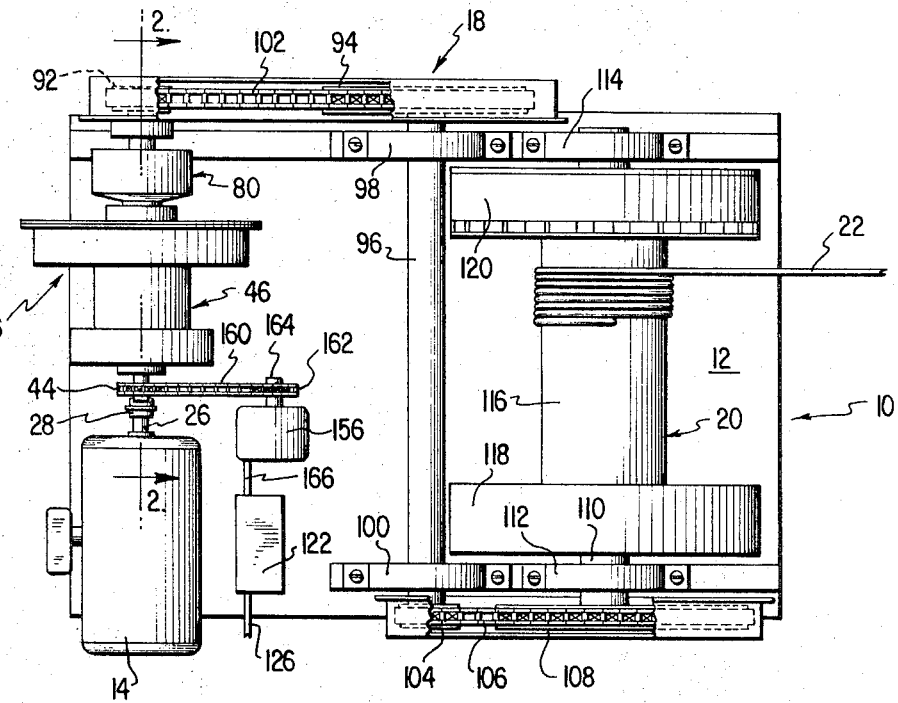
FIG. 1 is a plan view of a winch associated with the multispeed drive arrangement of this invention, certain parts being broken away for clarity of illustrations.
Figure 3:
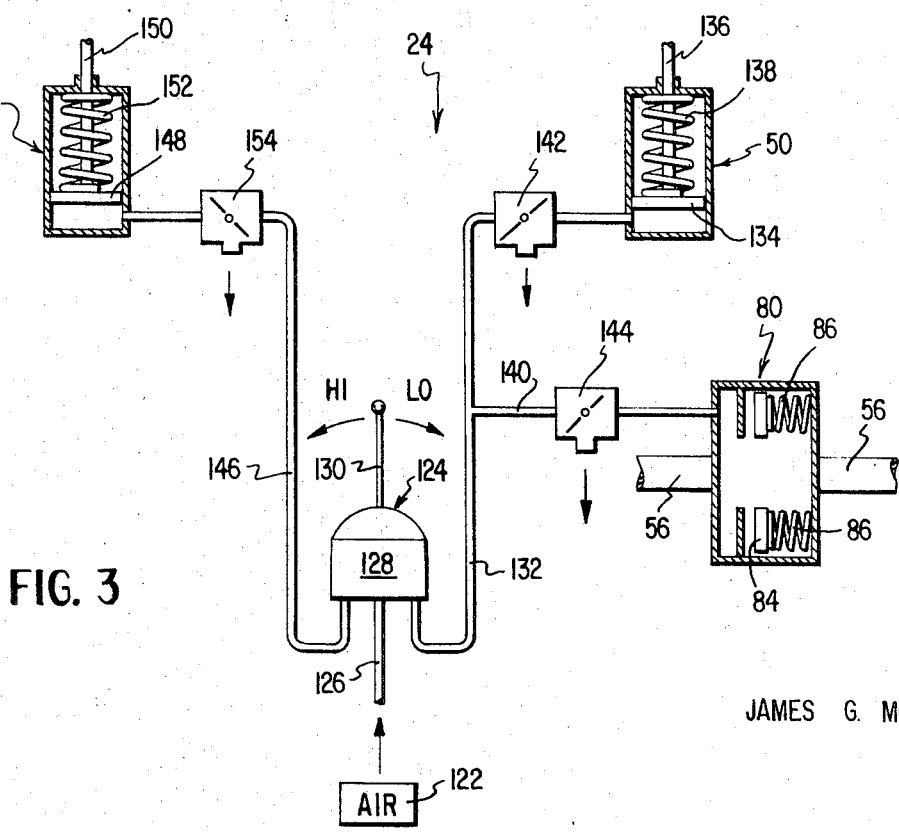
FIG. 3 is a schematic view of the control system utilized with drive arrangement of FIGS. 1 and 2.

Attention is directed to FIG. 1 wherein a skid-mounted winch unit comprises as major components a platform 12, a prime mover 14 and a multispeed drive arrangement 16 drivably interconnecting the prime mover 14 to a chain reduction unit 18 which is in turn drivably connected to a winch 20 having a suitable cable 22 associated therewith. As shown in FIG. 3, a control system 24 is provided to manipulate the multispeed drive arrangement 16 as will be explained.

The prime mover 14 may be of any suitable type and preferably operates at a substantially constant speed regardless of whether the winch 20 is undergoing immediate manipulation, the drive arrangement 16 being used to control torque delivery thereto. The prime mover 14 includes an output shaft 26 secured by a suitable coupling 28 to an input shaft or structure 30 of a first torque converter 32 of any suitable design. The input shaft 30 is mounted in a suitable bearing 34 on a support 36 and carries a sprocket wheel 38 for rotation therewith. The sprocket wheel 38 drives a chain 40 looped about a similar sprocket wheel 42 mounted on an input shaft or structure 44 of a circuit torque converter 46. Although the torque converter 46 may have different speed/torque characteristics than the torque converter 32, it is preferable that these converters be substantially identical. The input shaft 44 is mounted in a suitable bearing 48 which is also carried by the support 36. The chain 40 is arranged to drive the input shafts 30, 44 in the same direction.

The first torque converter 32 is provided with a fluid operator 50 (FIG. 3) to vary the speed of an output shaft or structure 52 with respect to the input shaft 30 in a manner well known in the art. The second torque converter 46 is likewise provided with a fluid operator 54 to vary the speed of an output shaft or structure 56 with respect to the input shaft 44. The output shaft 52 is mounted in a suitable bearing 58 on a support 60 which carries a more elaborate bearing assembly 62 for the output shaft 56. The output shaft 52 carries a relatively small sprocket wheel 64 in driving engagement with a relatively large sprocket wheel 68 including a central hub 70 rotatably mounted about the output shaft 56 by the use of suitable bearings 72.

The central hub 70 is rotatably mounted by a bearing 74 to a bearing block 76 which is in turn fixed to the support 60. It will accordingly be seen that the bearing assembly 62 comprises the bearings 72, the central hub 70, the bearing 74 and the bearing block 76.

A clutch flange 77 is affixed by suitable machine screws or the like 78 to the contral hub 70 for rotation therewith. The clutch flange 77 comprises a part of a suitable clutch 80 which is illustrated as a model POAir-CLUTCH of the Twin Disc Corporation. The clutch 80 includes a splined connection 83 with the output shaft 56 and a movable member 84 biased by fluid pressure against a plurality of springs 86 for selectively interconnecting the splined connnection 82 to the clutch flange 77. The intermediate part of the elongated output shaft 56 is supported by a bearing 88 mounted in an upright 90 secured to the platform 12.

When it is desired to operate the multispeed drive arrangement in a high range, the first torque converter or low range torque converter 32 is manipulated to deliver zero torque to the output shaft 52 by retracting the fluid operator 50. The clutch 80 is disengaged such that there is no torque transmission between the splined connection 82 and the clutch flange 77 so that no torque is transmitted from the output shaft 56 to the sprocket wheel 68. With the prime mover 14 operating, the output torque characteristics of the second or high range torque converter 46 is controlled by appropriately positioning the fluid operator 54. It will be apparent to those skilled in the art that the output characteristics of the high speed torque converter 46 may be varied substantially infinitely within the upper and lower limits prescribed by the design of the torque converter 46.

When it is desired to operate the multispeed drive arrangement 16 in a low range to deliver high torque and low speed to the chain reduction unit 18 and consequently the winch 20, the high speed torque converter 46 is manipulated to deliver zero output torque to the shaft 56 by retracting the fluid operator 54. The clutch 80 is manipulated to connect the splined connection 82 to the clutch flange 77 so that torque may be transmitted between the sprocket wheel 68 and the output shaft 56. Torque is then delivered from the low speed torque converter 32 by advancing the fluid operator 50 to any desired position. It will be apparent that the speed and torque of the output shaft 56 is substantially different with the low speed torque converter 32 so that the winch 20 may be operated at much lower speeds.

The chain reduction unit 18 comprises a sprocket 92 splined or otherwise secured to the output shaft 56, a larger sprocket wheel 94 mounted on a countershaft 96 which is supported by bearings 98, 100 affixed to the platform 12 and a chain 102 drivably connecting the sprockets 92, 94. The countershaft 96 carries a small sprocket 104 driving a chain 106 which is looped about a large sprocket wheel 108 mounted on the shaft 110 of the winch 20. The shaft 110 is mounted in suitable bearings 112, 114 carried by the platform 12. The winch 20 includes the customary spindle 116 to which the cable 22 is secured and the conventional side flanges 118, 120.

Referring to FIG. 3, the control system 24 comprises a source 122 of pressurized fluid, preferably compressed air, leading to a valve 124 of any suitable type through a conduit 126. In practice, a valve made by the Westinghouse Air Brake Company and sold under the trademark Flexair is satisfactory. This type of valve comprises a housing 128 from which extends a control handle 130. The handle 130 is illustrated in FIG. 3 in a neutral position wherein the conduit 126 is valved closed and the remaining conduits extending from the valve 124 are vented to atmosphere. Movement of the handle 130 in a clockwise direction operates to deliver compressed air to a first conduit 132 leading to the first fluid operator 50 to advance a piston 134 and piston rod 136 against the bias of a spring 138 to control the amount of torque delivered to the output shaft 52 of the first torque converter 32. A branch conduit 140 connects the first conduit 132 to the clutch 80 and comprises a bored passageway in the output shaft 56.

An important feature of the control system 24 is that the movable member 84 of the clutch 80 responds to a lower fluid pressure than the piston 134. This results because the aggregate bias produced by the springs 86 in the surface area of the movable member 184 is selected and compared to the bias of the spring 138 and the area of the piston 134. It will accordingly be seen that clockwise movement of the control handle 130 operates first to engage the clutch 80 and then to manipulate the first torque converter 32 to deliver torque therefrom.

Positioned in the first conduit 32 adjacent the fluid operator 50 and in the branch conduit 140 adjacent the clutch 80 are valves 142, 144 which operate to exhaust the operator 50 and the clutch 80 upon return of the control handle 130 toward the neutral position. The valves 142, 144 may be of any suitable type but in practice a valve known as a Quick Release Valve sold by the Westinghouse Air Brake Company performs satisfactorily.

Movement of the control handle 130 in a counter-clockwise direction operates to deliver compressed air through a second conduit 146 to the second fluid operator 54 to advance a piston 148 and piston rod 150 against the bias of a spring 152 to control delivery of torque from the second torque converter 46. Positioned in the conduit 146 is a valve 154 of similar construction to the valves 142, 144.

When the drive arrangement 16 is operating in the low speed situation with the control handle 130 in the low position, pressurized fluid is delivered to engage the clutch 80 and advance the piston rod 136 to deliver torque from the first torque converter 32. Movement of the control handle 130 toward the neutral position operates to vent the conduit 132 whereupon the valves 142, 144 act to exhaust the fluid operator 50 and the clutch 80 respectively. Because the spring 138 is stronger than the springs 86, the piston rod 136 acts to decrease the torque delivered from the torque converter 32 just prior to the disengagement of the clutch 80. It will further be seen that the cooperation of the valves 124, 142, 144 act to disengage the torque converter 32 prior to engagement of the torque converter 46.

Figure 2:
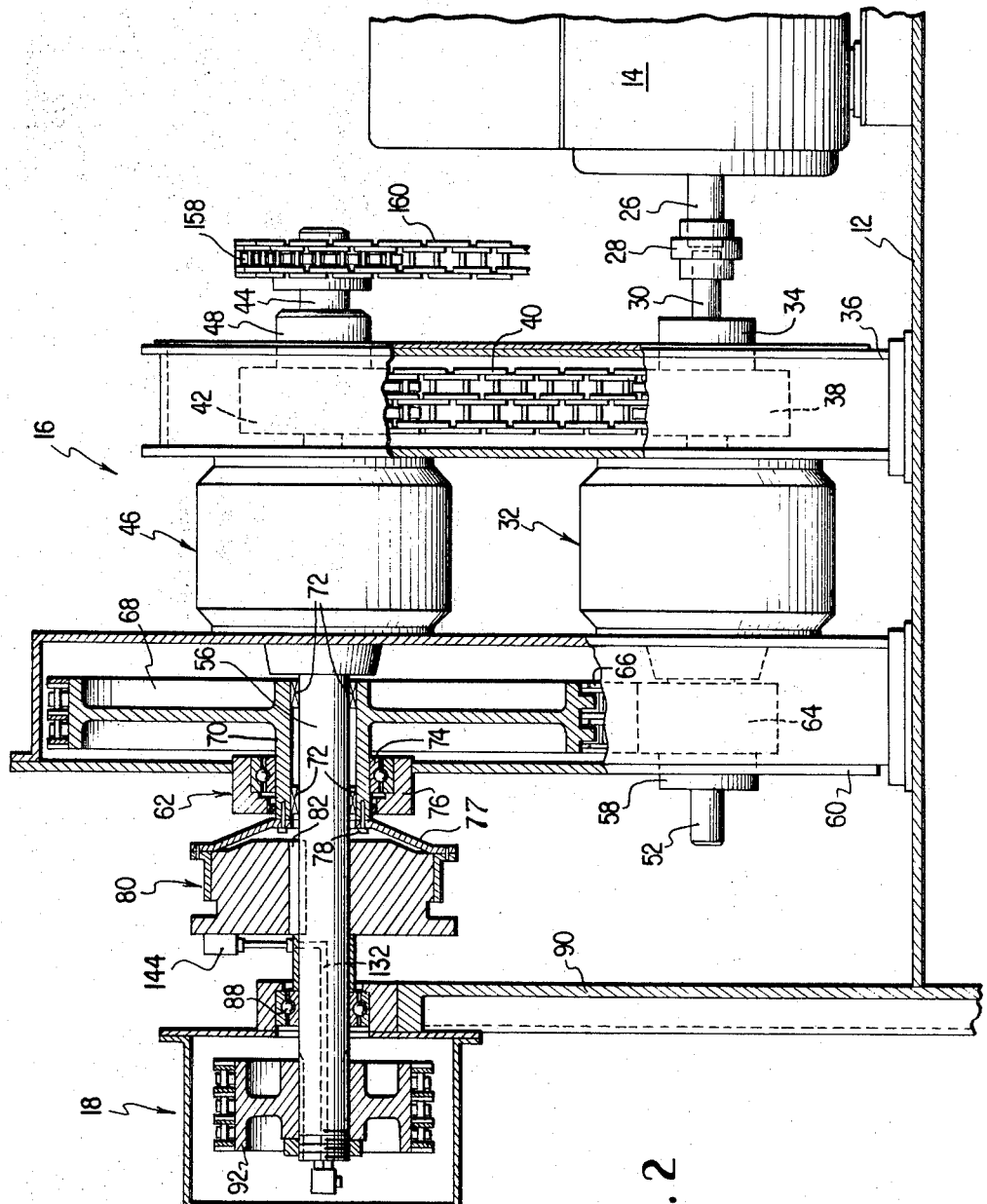
FIG. 2 is a cross-sectional view taken generally along line 2—2 of FIG. 1 as see in the direction indicated by the arrows, certain parts being broken away for clarity of illustrations.

Another feature of the invention resides in the drive connection from the prime mover 124 to auxiliary equipment 156, such as an air compressor, which requires substantially continuous application of power thereto and which may conveniently be located on the platform 12. As shown in FIGS. 1 and 2, a sprocket wheel 158 is affixed to the input shaft 44 of the second torque converter 46 and carries a chain 116 driving a sprocket wheel 162 on an input shaft or structure 164 of the air compressor 156. The air compressor 156 includes an output high pressure conduit 166 delivering compressed air to a reservoir which may constitute the source of fluid pressure 122. It will accordingly be seen that the air compressor 156 operates whenever the prime mover 14 is driven and is not dependent upon the operation of the winch 20.

I claim:

1. A multispeed drive arrangement comprising first and second torque converters having input structure, output structure and first fluid operated means and second means for varying the speed of the respective output structure;

means connecting the input structures together for concurrent rotation; and means selectively interconnecting the output structures together for concurrent rotation comprising a first wheel fixed to the output structure of the first torque converter;

a second wheel rotatably mounted on the output structure of the second torque converter;

means interconnecting the first and second wheels for concurrent rotation;

fluid operated clutch means selectively interconnecting the output structure of the second torque converter to the second wheel; and control means including a source of pressurized fluid, conduit means in communication with the fluid source for conveying pressurized fluid to the first varying means and the clutch means, and means insuring engagement of the clutch means prior to operation of the first varying means.

2. The drive arrangement of claim 1 wherein the control means includes a second conduit means for delivering pressurized fluid to the second varying means; and valve means for selectively interconnecting the fluid source to the first and second conduit means.

3. The drive arrangement of claim 2 wherein the control means includes means for deenergizing one of the varying means before energizing the other varying means.

4. The drive arrangement of claim 1 further comprising a prime mover drivably connected to one of the input structures;

auxiliary equipment, requiring continual power input, having input structure; and means drivably interconnecting the other input structure and the auxiliary equipment input structure.

5. The drive arrangement of claim 1 wherein the second wheel is larger than the first wheel and wherein the first and second wheels comprise sprocket wheels and the means interconnecting the first and second wheels comprises a chain.

6. The drive arrangement of claim 1 wherein the first and second torque converters have substantially identical speed/torque characteristics.

7. The drive arrangement of claim 1 further comprising winch means drivably connected to the output structure of the second torque converter.

8. In combination,
a platform having a plurality of upright supports thereon;
a prime mover, on the platform, having an output shaft;
a multispeed drive arrangement comprising
    a low range torque converter having an input shaft axially aligned with the prime mover output shaft and coupled thereto, bearing means carried by one of the supports mounting the input shaft for rotation with respect thereto, a sprocket wheel on the input shaft, an output shaft axially aligned with the input shaft, bearing means carried by one of the supports mounting the output shaft for rotation with respect thereto, a sprocket wheel on the output shaft and fluid operated means for varying the speed of the output shaft with respect to the speed of the input shaft;
    a high range torque converter spaced from the low range torque converter and having an input shaft, bearing means carried by one of the supports mounting the input shaft for rotation with respect thereto, a sprocket wheel on the input shaft, an output shaft axially aligned with the input shaft, a sprocket wheel larger than the sprocket wheel on the low range output shaft disposed about the high range output shaft, bearing means on one of the supports mounting the large sprocket wheel for rotation with respect thereto and fluid operated means for varying the speed of the output shaft with respect to the speed of the input shaft;
    a chain connecting the sprockets on the input shafts for rotation in the same direction;
    a chain connecting the sprockets on the output shafts for rotation in the same direction;
    a fluid operated clutch having a first part fixed for rotation with the high range output shaft, a second part fixed to the large sprocket wheel and means selectively interconnecting the first and second parts to transmit torque from the large sprocket wheel to the high range output shaft;
    and control means including
        a source of pressurized fluid;
        first conduit means for conveying pressurized fluid to the low range fluid operated speed varying means and to the fluid operated clutch means;
        second conduit means for conveying pressurized fluid to the high range fluid operated speed varying means;
        valve means for selectively connecting the fluid source to the first and second conduit means;
        means ensuring operation of the clutch means prior to operation of the low range speed varying means when the valve means delivers fluid to the first conduit; and
        means ensuring disengagement of the clutch means prior to operation of the high range speed varying means when the valve means terminates fluid delivery to the first conduit and commences fluid delivery to the second conduit.

9. The drive arrangement of claim 1 wherein the insuring means comprises the clutch means responsive to a lower fluid pressure than the first varying means.

References Cited
UNITED STATES PATENTS 3,383,951    5/1968    Morrow    74—718

FOREIGN PATENTS 885,427    9/1943    France    74—720

ROBERT M. WALKER, Primary Examiner